(12) United States Patent
Wu et al.

(10) Patent No.: US 10,495,828 B2
(45) Date of Patent: Dec. 3, 2019

(54) OPTICAL FIBER CONNECTOR

(71) Applicant: ADVANCED-CONNECTEK INC., New Taipei (TW)

(72) Inventors: Jun Wu, New Taipei (TW); Yang-Yang Cui, New Taipei (TW)

(73) Assignee: ADVANCED-CONNECTEK INC., New Taipei (TW)

( * ) Notice: Subject to any disclaimer, the term of this patent is extended or adjusted under 35 U.S.C. 154(b) by 0 days.

(21) Appl. No.: 16/031,303

(22) Filed: Jul. 10, 2018

(65) Prior Publication Data

US 2018/0321448 A1    Nov. 8, 2018

Related U.S. Application Data

(63) Continuation-in-part of application No. 15/920,901, filed on Mar. 14, 2018, now Pat. No. 10,156,685.

(30) Foreign Application Priority Data

Mar. 14, 2017    (CN) .......................... 2017 1 0148879

(51) Int. Cl.
*G02B 6/38*    (2006.01)

(52) U.S. Cl.
CPC .......... *G02B 6/3898* (2013.01); *G02B 6/3825* (2013.01); *G02B 6/3893* (2013.01)

(58) Field of Classification Search
CPC .. G02B 6/3893; G02B 6/3825; G02B 6/3898; G02B 6/3807
See application file for complete search history.

(56) References Cited

U.S. PATENT DOCUMENTS 9,958,621 B2 *    5/2018    Wong ................... G02B 6/3825

\* cited by examiner

*Primary Examiner* — John Bedtelyon
(74) *Attorney, Agent, or Firm* — Muncy, Geissler, Olds & Lowe, P.C.

(57) ABSTRACT

An optical-fiber connector includes a handle, a sleeve member, and connecting housings each including a housing body and an elastic arm. Each elastic arm includes engaging blocks protruding from the elastic arm and a slidable groove on the corresponding housing body. The slidable grooves face each other. The handle includes a handle body between the elastic arms and a handle member extending from the handle body. Two slidable blocks are at two sides of the handle body and respectively inserted into the slidable grooves, and two protruding blocks are at two sides of the handle member. The sleeve member is fitted over the handle member. First and second engaging grooves are on a wall surface of the sleeve member, and the first and second engaging grooves are on different positions of the wall surface of the sleeve member. Accordingly, the length of the handle is adjustable.

20 Claims, 8 Drawing Sheets

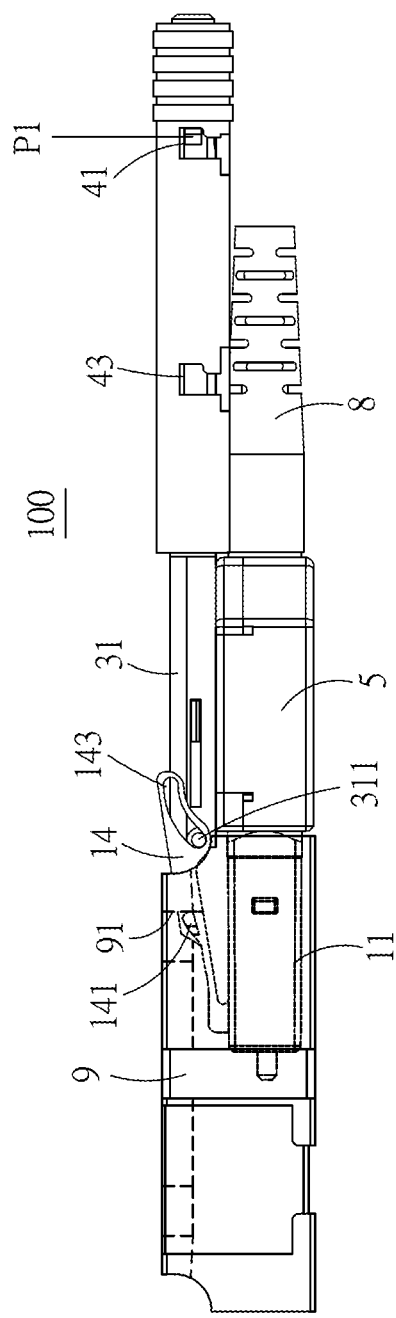
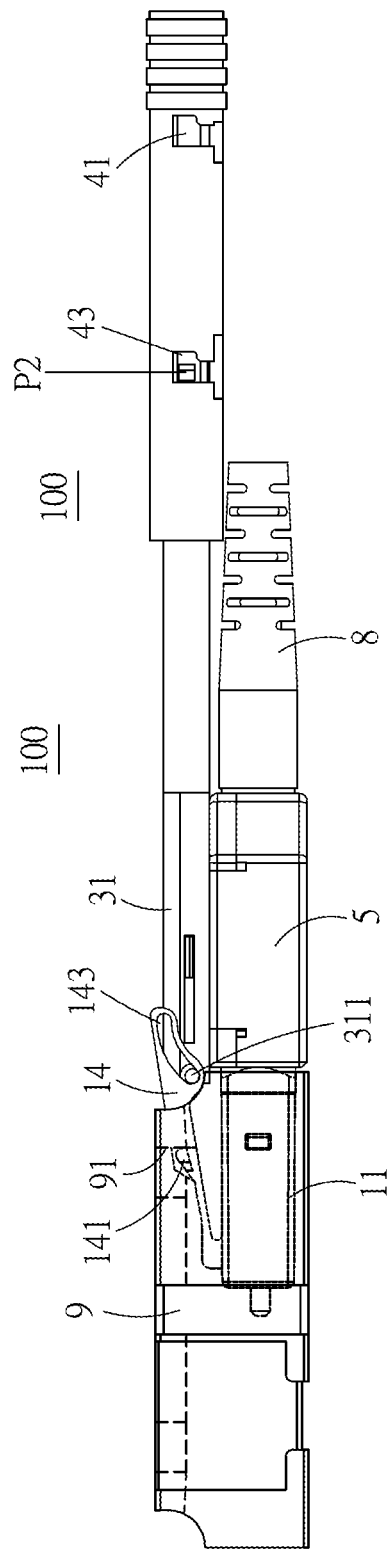

OPTICAL FIBER CONNECTOR

CROSS-REFERENCES TO RELATED APPLICATIONS

This application is a continuation-in-part (CIP) of application Ser. No. 15/920,901, filed on Mar. 14, 2018 with claiming foreign priority of CN201710148879.8 The prior application is herewith incorporated by reference in its entirety.

FIELD OF THE INVENTION

The instant disclosure relates to a connector, and more particular to an optical fiber connector.

BACKGROUND

The optical fiber is an tool for optical transmission. An optical connector is used for connecting the optical fiber with different electronic devices, so that the electronic devices can utilize the signals transmitted by the optical fiber. A conventional optical-fiber connector assembly includes an adapter and a male optical-fiber connector. The adapter is assembled to the electronic device. Hence, when the male optical-fiber connector is inserted into the adapter, the male optical-fiber is fixed with the adapter and signals can be transmitted to the electronic device through the optical fiber connector assembly.

A cabinet for aligning the connectors has a number of jumper wires spaced by limited distance. When one of the jumper wires is to be replaced, the operator cannot press on the elastic arm of the male optical-fiber connector in a convenient manner to detach the elastic arm of the male optical-fiber connector from the adapter. As a result, the operator cannot pull the jumper wires conveniently, and the operator may even damage the jumper wires as well as other jumper wires. Additionally, the number of the jumper wires would be limited by the space of the cabinet provided for assembling the jumper wires.

SUMMARY OF THE INVENTION

Even though some conventional male optical-fiber connectors have handles with fixed lengths. The length of the handle is not adjustable and these connectors have limited applicability.

In view of these, an embodiment of the instant disclosure provides an optical fiber connector comprising a connecting housing, a handle, and a sleeve member. The connecting housing comprises a housing body and an elastic arm. The elastic arms is outwardly and inclinedly extending from the housing body. The handle comprises a handle body and a handle member. The handle body drives the elastic arm, and the handle member is extending from a rear end of the handle body. Two protruding blocks are at two sides of the handle member. The sleeve member is fitted over the handle member. A plurality of first engaging grooves and a plurality of second engaging grooves are on a wall surface of the sleeve member, and the first engaging grooves and the second engaging grooves are on different positions of the wall surface of the sleeve member. When the sleeve member is at a first position of the handle member, the protruding blocks are respectively engaged with the first engaging grooves, so that a front end of the sleeve member is moved toward a front end of the handle member to reduce a length of an assembly of the handle and the sleeve member. When the sleeve member is at a second position of the handle member, the protruding blocks are respectively engaged with the second engaging grooves, so that the front end of the sleeve member is moved toward a rear end of the handle member to increase the length of the assembly of the handle and the sleeve member.

In one embodiment, the optical fiber connector further comprises a plurality of connecting housings. The elastic arm comprises a plurality of engaging blocks and a slidable groove. The engaging blocks are outwardly protruding from two sides of the elastic arm, respectively the slidable groove is on a side portion of the elastic arm, and a slidable block is on the handle body and inserted into the slidable groove.

In one embodiment, an inner surface of the sleeve member comprises a plurality of slots, and the slots are extending from the front end of the sleeve member toward a rear end of the sleeve member, and the slots are in communication with the first engaging grooves and the second engaging grooves, respectively.

In one embodiment, the first engaging grooves are symmetrically arranged on the sleeve member, and each of the first engaging grooves comprises a first limiting groove and a first turn-around groove. The first limiting groove is on a path of the corresponding slot and the first turn-around groove is laterally extending from the first limiting groove.

In one embodiment, a first buckling groove is at an inner side of each of the first turn-around grooves, and each of the protruding blocks is engaged with and positioned in the corresponding first buckling groove.

In one embodiment, the second engaging grooves are symmetrically arranged on the sleeve member, and each of the second engaging grooves comprises a second limiting groove and a second turn-around groove. The second limiting groove is on a path of the corresponding slot and the second turn-around groove is laterally extending from the second limiting groove.

In one embodiment, a second buckling groove is at an inner side of each of the second turn-around grooves, and each of the protruding blocks is engaged with and positioned in the corresponding second buckling groove.

In one embodiment, the optical fiber connector further comprises an outer housing. Two sides of a front end of the outer housing are connected to the connecting housing, respectively, and a rear end of the outer housing is connected to a tail cap.

In one embodiment, a buckling block is on a surface of the outer housing, and the handle body comprises a rail for engaging with the buckling block.

In one embodiment, the optical fiber connector further comprises a plurality of core components respectively assembled in the connecting housings.

In one embodiment, each of the slidable grooves is a curved groove.

Another embodiment of the instant disclosure provides an optical fiber connector comprising a connecting housing and a handle. The connecting housing comprises a housing body and an elastic arm outwardly and inclinedly extending from the housing body. A side portion of the elastic arm comprises a slidable groove. The handle comprises a handle body driving the elastic arm. A slidable block is on the handle body and inserted into the slidable groove. When the handle is pulled to move in a horizontal direction, the slidable block of the handle body is moved from an original position of the slidable groove to an end position of the slidable groove to drive an end portion of the elastic arm to swing toward a surface of the connecting housing.

In one embodiment, the slidable groove is a curved groove. A first end of the curved groove is near the connecting housing, and A second end of the curved groove forms the end portion of the elastic arm.

In one embodiment, the optical fiber connector further comprises an outer housing. Two sides of a front end of the outer housing are connected to the connecting housing. A buckling block is on a surface of the outer housing, and the handle body comprises a rail for engaging with the buckling block to limit the handle body to move in the horizontal direction.

In one embodiment, two engaging protrusions are at two sides of the buckling block, and two engaging grooves are at an inner surface of the rail for engaging with the engaging protrusions, respectively.

In one embodiment, an opening of the rail has two guiding surfaces, and each of the engaging protrusions has a chamfered angle for guiding the corresponding guiding surface.

According to some embodiments of the instant disclosure, the sleeve member is fitted over the handle to allow the length of the handle to be adjustable. Since the handle is retractable, the optical fiber connector can be widely used for cabinets having different intervals between the adapters. When the wire (along with the optical fiber connector) is to be replaced, an operator can detach the wire having the optical fiber connector from the cabinet by adjusting the length of the handle to a proper length. Hence, the optical fiber transmission cables can be detached from the adapters in a convenient manner. Accordingly, a more number of the transmission wires can be assembled in a cabinet as compared with the conventional; that is, the transmission wires can be aligned in a densely manner without affecting the convenience in unplugging or plugging the wires.

Detailed description of the characteristics and the advantages of the instant disclosure are shown in the following embodiments. The technical content and the implementation of the instant disclosure should be readily apparent to any person skilled in the art from the detailed description, and the purposes and the advantages of the instant disclosure should be readily understood by any person skilled in the art with reference to content, claims, and drawings in the instant disclosure.

BRIEF DESCRIPTION OF THE DRAWINGS

The instant disclosure will become more fully understood from the detailed description given herein below for illustration only, and thus not limitative of the instant disclosure, wherein:

FIG. 7 illustrates a side view showing that the sleeve member of the optical fiber connector is at a first position;

FIG. 8 illustrates a side view showing that the sleeve member of the optical fiber connector is at a second position.

DETAILED DESCRIPTION

Figure 1:
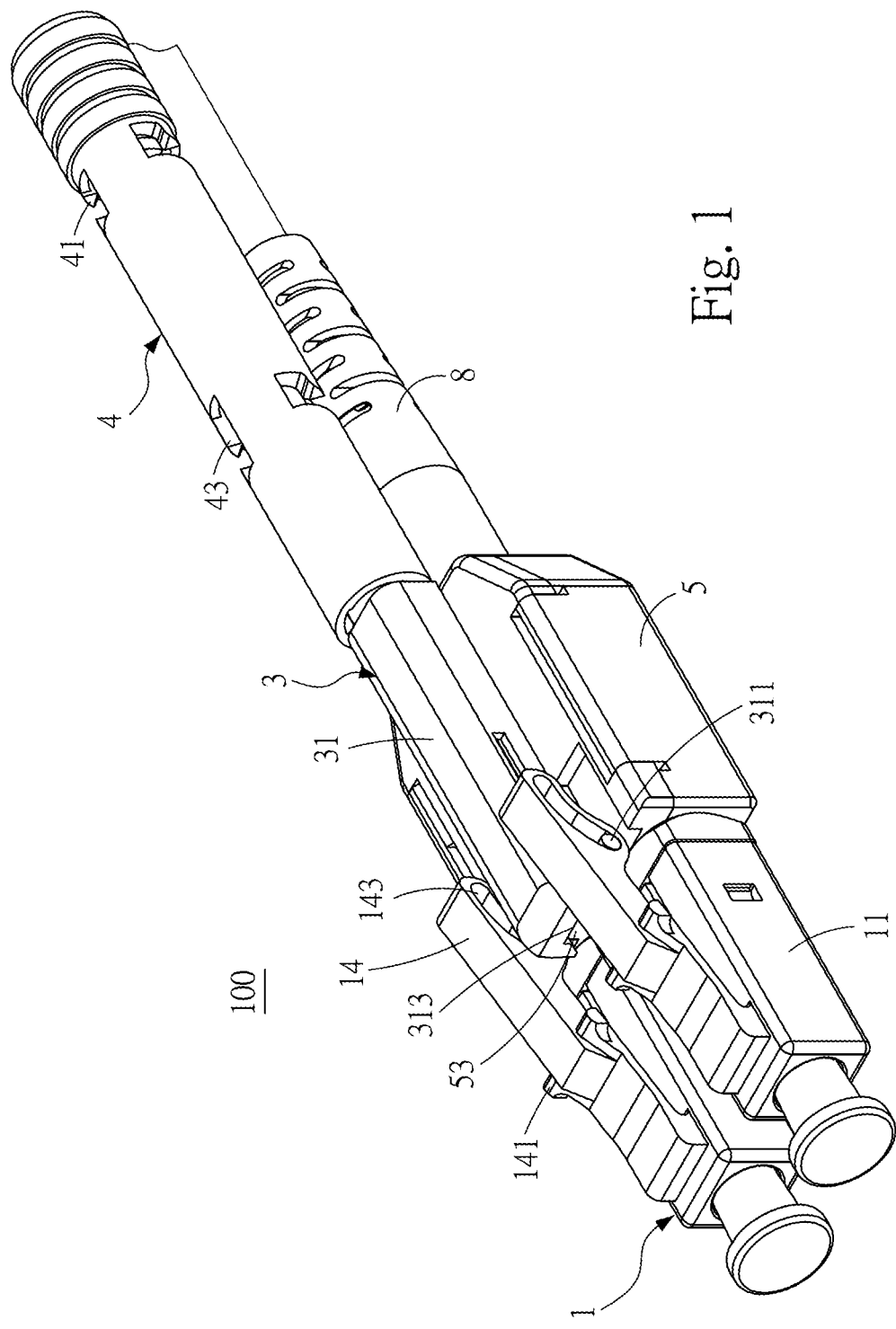
FIG. 1 illustrates a perspective view of an optical fiber connector according to an exemplary embodiment of the instant disclosure.
Figure 2:
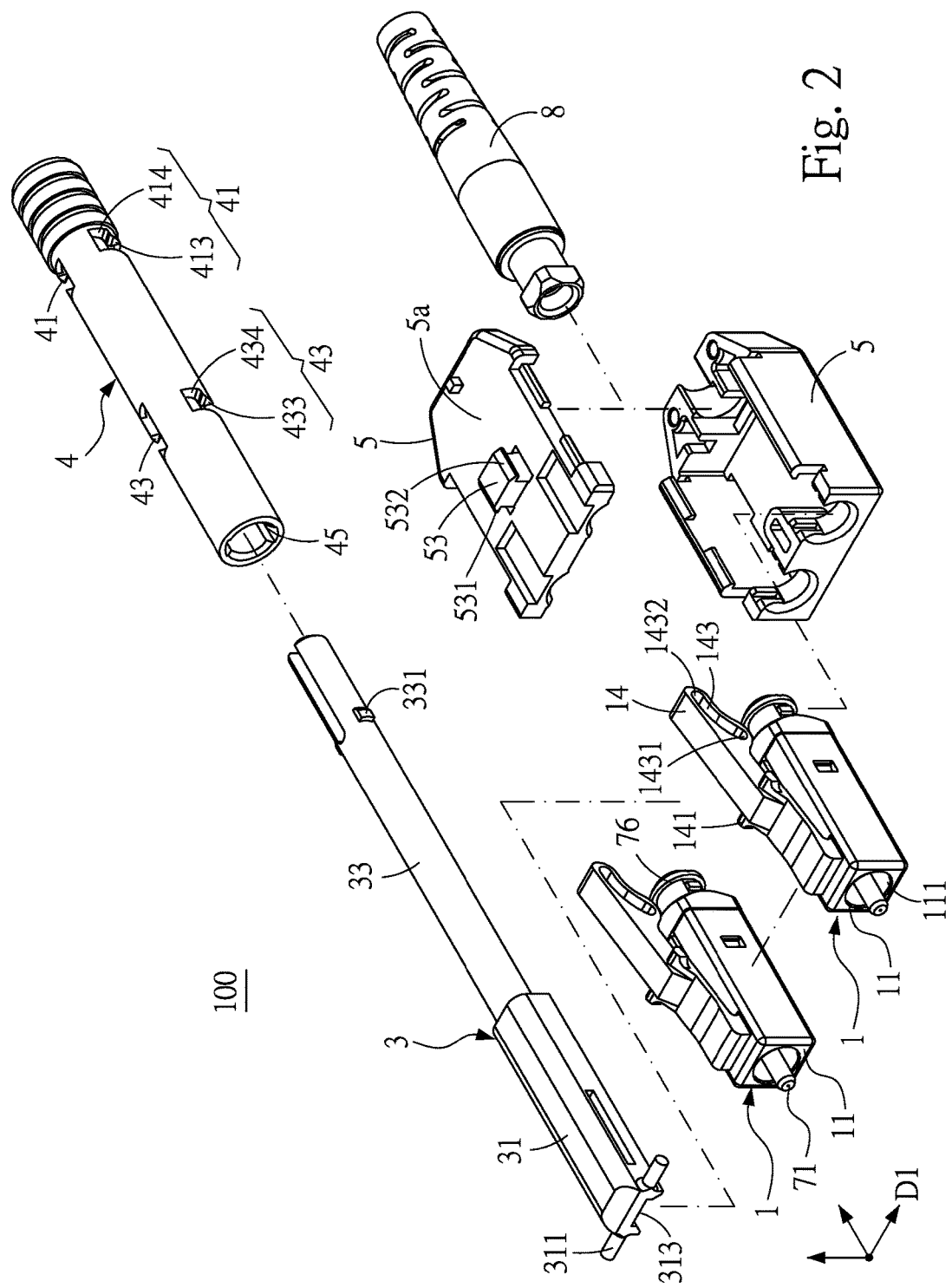
FIG. 2 illustrates an exploded view of the optical fiber connector.
Figure 3:
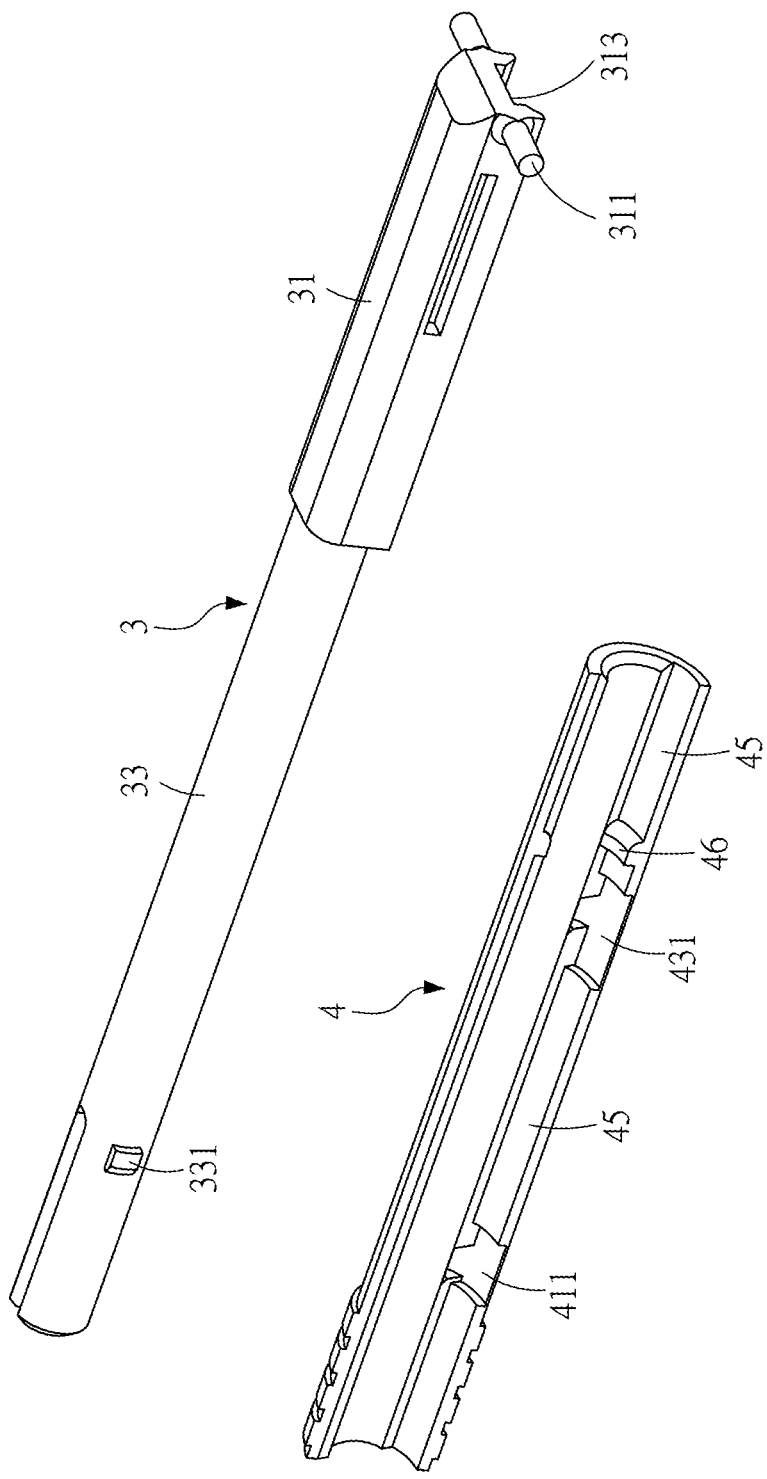
FIG. 3 illustrates an exploded view (1) of a handle and a sleeve member of the optical fiber connector.
Figure 4:
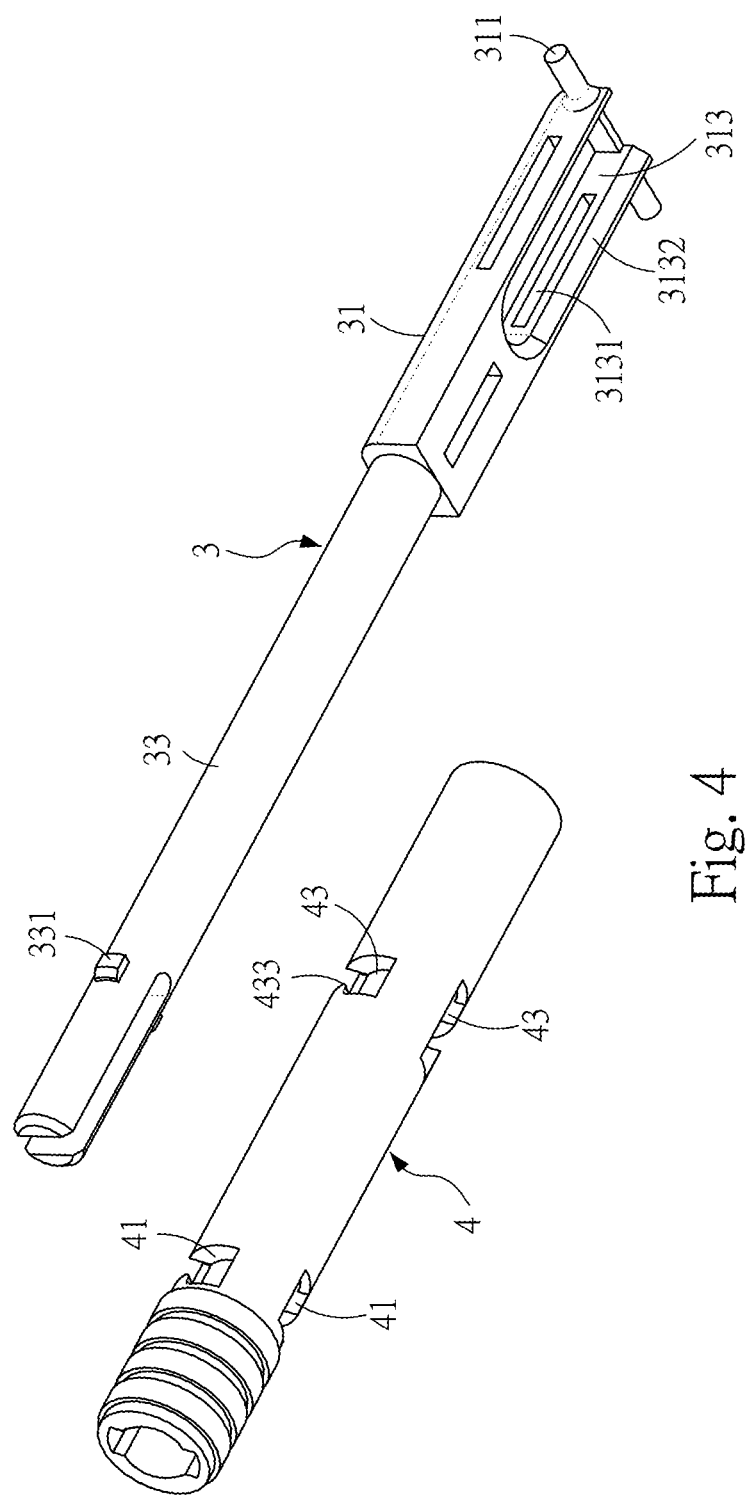
FIG. 4 illustrates an exploded view (2) of the handle and the sleeve member of the optical fiber connector.
Figure 5:
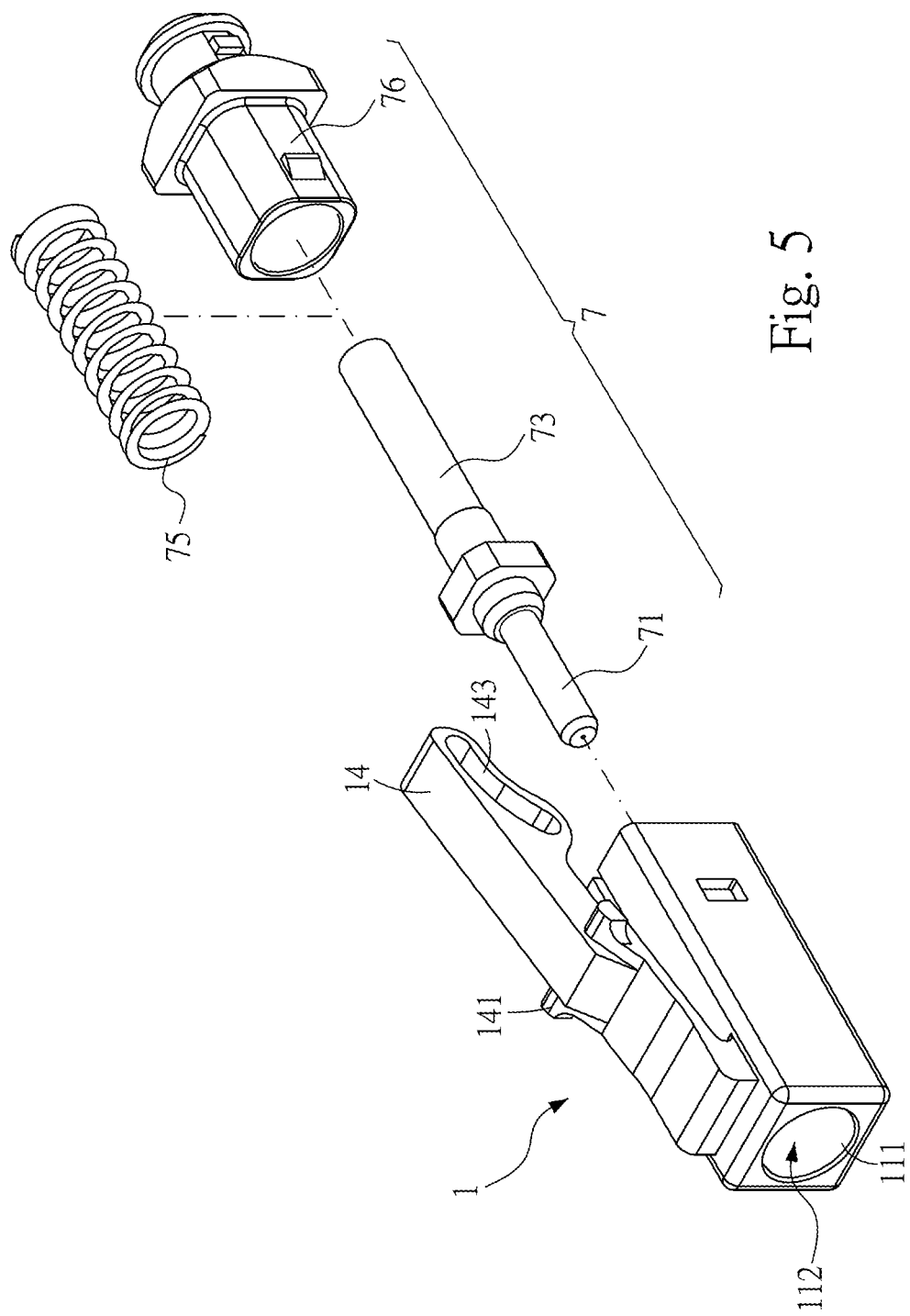
FIG. 5 illustrates an exploded view of connecting housings and other components of the optical fiber connector.

Please refer to FIGS. 1 to 5, illustrating an optical fiber connector 100 of an exemplary embodiment according to the instant disclosure. FIG. 1 illustrates a perspective view of the connector, FIG. 2 illustrates an exploded view of the connector, FIGS. 3 and 4 illustrates exploded views showing a handle 3 and a sleeve member 4 of the optical fiber connector 100. FIG. 5 illustrates an exploded view showing connecting housings 1 and other components of the optical fiber connector 100. In FIG. 3, the sleeve member 4 is cross-sectioned for showing the structures in the sleeve member 4.

Please refer to FIGS. 1 to 5. In this embodiment, the optical fiber connector 100 comprises two connecting housings 1, but embodiments are not limited thereto. In some embodiments, the optical fiber connector 100 may comprise one, three, or more connecting housings 1. In this embodiment, two connecting housings 1 are assembled with one handle 3, but embodiments are not limited thereto. In one embodiment, three or more connecting housings 1 are assembled with one handle 3.

Please refer to FIGS. 1 to 5. The optical fiber connector 300 comprises a plurality of connecting housings 1, a handle 3, and a sleeve member 4. Each of the connecting housings 1 comprises a housing body 11, an opening 111, and a receiving space 112. The housing bodies 11 are arranged side-by-side. Each of the housing bodies 11 is of a cuboid structure. Each of the receiving spaces 112 is formed in each of the housing bodies 11. For each of the connecting housings 1, the opening 111 is formed on one end of the housing body 11 and in communication with the receiving space 112. Moreover, the connecting housings 1 have spacing between the housing bodies 11. The housing bodies 11 are arranged side-by-side and a gap is between the housing bodies 11.

Figure 6:
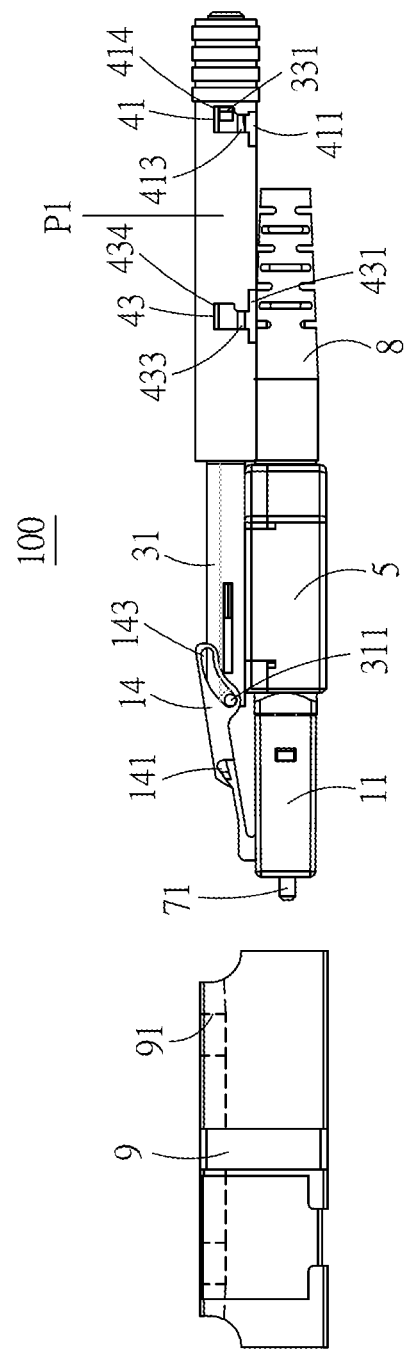
FIG. 6 illustrates a side view showing that the optical fiber connector is to be inserted into an adapter.

Please refer to FIGS. 1 to 5. Each of the connecting housings 1 comprises an elastic arm 14. A front end of each of the elastic arms 14 is outwardly and inclinedly extending from one of two sides of the corresponding housing body 11, and a rear end of each of the elastic arms 14 is at the other side of the corresponding housing body 11. A height difference is between the rear end of the elastic arm 14 and the outer surface of the housing body 11. Each of the elastic arms 14 comprises a plurality of engaging blocks 141 and a slidable groove 143. The engaging blocks 141 are outwardly protruding from two sides of the elastic arm 14, respectively. The engaging blocks 141 are outwardly protruding from the two sides of a middle portion of the elastic arm 14 for buckling with a buckling portion 91 of an adapter 9 (as shown in FIG. 7). Each of the slidable grooves 143 is on the elastic arm 14, and the slidable grooves 143 of the connecting housings 1 face each other. Moreover, in one embodiment, as shown in FIGS. 2 and 6, each of the slidable grooves 143 is defined through the elastic arm 14 along a lateral direction D1 of the elastic arm 14. In one embodiment, the lateral direction is horizontally a left-to-right direction. The elastic arm 14 has a first side and a second side opposite to the first side, and the first side is in communication with the second side through the corresponding slidable groove 143. The two engaging blocks 141 are outwardly protruding from the first side and the second side of the elastic arm 14, respectively.

Please refer to FIGS. 6 to 8. FIG. 6 illustrates a side view showing that the optical fiber connector is to be inserted into an adapter 9. FIG. 7 illustrates a side view showing that the sleeve member 4 is at a first position P1. FIG. 8 illustrates a side view showing that the sleeve member 4 is at a second position P2. The elastic arm 14 is an element with resilient flexibility. When the optical fiber connector 100 is inserted into the housing of the adapter 9, the optical fiber connector 100 is buckled with the buckling portion 91 in the housing of the adapter 9 because of the resilient flexibility of the elastic arms 14.

Please refer to FIGS. 1 to 5. In this embodiment, the optical fiber connector 100 comprises a plurality of core components 7 respectively assembled in the connecting housings 1. Each of the core components 7 is received in the receiving space 112 of the corresponding connecting housing 1. Each of the core components 7 comprises an insertion pin 71 at the corresponding opening 111. In this embodiment, each of the core components 7 comprises a core member 73, a spring 75, and a sleeve piece 76. The core member 73 is made of ceramics and used for enclosing optical fiber cables, and the optical fiber cables are aligned with the core hole of the core member 73. The insertion pin 71 is at one of two ends of the core member 73. One of two ends of the sleeve piece 76 is fitted over the other end of the core member 73, and the other end of the sleeve piece 76 is connected to a transmission cable. The sleeve piece 76 is assembled at the rear portion of the connecting housings 1. The spring 75 is fitted over the other end of the core member 73 and received in the sleeve piece 76. One of two ends of the spring 75 is abutted against the core member 73, and the other end of the spring 75 is abutted against the sleeve piece 76. The spring 75 allows the core member 73 to have a buffering upon being forced.

Please refer to FIGS. 1 to 5. The handle 3 is an elongate plate and extending above the transmission cable. The handle 3 comprises a handle body 31 between the elastic arms 14 and a handle member 33 extending from a rear end of the handle body 31. The handle body 31 is of rectangular shaped. Two slidable blocks 311 are at two sides of the handle body 31 and respectively inserted into the slidable grooves 143. Two protruding blocks 331 are at two sides of the handle member 33. In one embodiment, the slidable block 311 is extending along the lateral direction D1, inserted into the slidable groove 143 from the first side of the elastic arm 14, and exposed from the second side of the elastic arm 14.

Please refer to FIGS. 1 to 5. The sleeve member 4 is an elongate circular tube. The sleeve member 4 is fitted over the handle member 33. A plurality of first engaging grooves 41 and a plurality of second engaging grooves 42 are on a wall surface of the sleeve member 4, and the first engaging grooves 41 and the second engaging grooves 42 are on different positions of the wall surface of the sleeve member 4. When the sleeve member 4 is at a first position P1 of the handle member 33, the protruding blocks 331 are respectively engaged with the first engaging grooves 41, so that a front end of the sleeve member 4 is moved toward a front end of the handle member 33 to reduce an overall length of the assembly of the handle 3 and the sleeve member 4. That is, most parts of the handle 3 are received in the sleeve member 4. When the sleeve member 4 is at a second position P2 of the handle member 33, the protruding blocks 331 are respectively engaging with the second engaging grooves 42, so that the front end of the sleeve member 4 is moved toward a rear end of the handle member 33 to increase the overall length of the assembly of the handle 3 and the sleeve member 4. That is, the overall length of the assembly of the handle 3 and the sleeve member 4 increases.

Please refer to FIGS. 1 to 5. An inner surface of the sleeve member 4 comprises a plurality of slots 45. The slots 45 are extending from the front end of the sleeve member 4 toward a rear end of the sleeve member 4, and the slots 45 are in communication with the first engaging grooves 41 and the second engaging grooves 43, respectively. When the handle member 33 is inserted into the sleeve member 4, the protruding blocks 331 of the handle member 33 is received in the slots 45. Hence, a user can adjust the position of the sleeve member 4 relative to the handle 3 to allow the protruding blocks 331 to be engaged with the first engaging grooves 41 or the second engaging grooves 42.

Please refer to FIG. 3. When the sleeve member 4 is assembled with the handle member 33, the protruding blocks 331 of the handle member 33 are slid into the slots 45 of the sleeve member 4. The sleeve member 4 comprises a plurality limiting blocks 46. The limiting blocks 46 are on the slots 45 and adjacent to the second engaging grooves 43, respectively. When the protruding block 331 crosses over the limiting block 46 and engages with the second engaging groove 43, the limiting blocks 46 can be used for stopping the protruding blocks 331 to prevent the sleeve member 4 departing from the handle member 33.

Please refer to FIGS. 1 to 5. In this embodiment, the first engaging grooves 41 are symmetrically arranged on two opposite portions of the wall surface of the sleeve member 4. Each of the first engaging grooves 41 comprises a first limiting groove 411 and a first turn-around groove 413. The first limiting groove 411 is on a path of the corresponding slot 45, and the first turn-around groove 413 is laterally extending from the first limiting groove 411. The first limiting grooves 411 and the first turn-around grooves 413 are defined through the wall surface of the sleeve member 4, respectively. A first buckling groove 414 is at an inner side of each of the first turn-around grooves 413, and each of the protruding blocks 331 is engaged with and positioned in the corresponding first buckling groove 414. Each of the first buckling grooves 414 and each of the first limiting grooves 411 are respectively at two ends of the corresponding first turn-around groove 413, and the first buckling groove 414, the first limiting groove 411, and the first turn-around groove 413 form a laid H shape structure.

When the protruding blocks 331 of the handle member 33 are engaged with the first engaging grooves 41, the sleeve member 4 is moved slightly to allow the protruding blocks 331 to be slid into the first turn-around grooves 413 from the first limiting grooves 411, respectively. Then, the sleeve member 4 is further forced, so that the protruding blocks 331 are engaged with and positioned in the first buckling grooves 414 at the inner sides of the first turn-around grooves 413, respectively. Moreover, the corner of each of the first buckling grooves 414 has an inclined portion for facilitating the corresponding protruding block 331 to be received in or slid out of the corresponding first buckling groove 414. Conversely, when the protruding blocks 331 of the handle member 33 are to be engaged with the second engaging grooves 43 from the first engaging grooves 41, respectively, the protruding blocks 331 are moved from the first turn-around grooves 413 to the first limiting grooves 411, respectively. Then, the sleeve member 4 is further forced, so that the protruding blocks 331 are moved to the slots 45 and slid into the second engaging grooves 43, respectively.

Please refer to FIGS. 1 to 5. In this embodiment, the second engaging grooves 43 are symmetrically arranged on two opposite portions of the wall surface of the sleeve member 4. Each of the second engaging grooves 43 comprises a second limiting groove 431 and a second turn-around groove 433. The second limiting groove 431 is on a path of the corresponding slot 45, and the second turn-around groove 433 is laterally extending from the second limiting groove 431. The second limiting grooves 431 and the second turn-around grooves 433 are defined through the wall surface of the sleeve member 4, respectively. A second buckling groove 434 is at an inner side of each of the second turn-around grooves 433, and each of the protruding blocks 331 is engaged with and positioned in the corresponding second buckling groove 434. Each of the second buckling grooves 434 and each of the second limiting grooves 431 are respectively at two ends of the corresponding second turn-around groove 433, and the second buckling groove 434, the second limiting groove 431, and the second turn-around groove 433 form a laid H shape structure.

Please refer to FIGS. 1 to 5. In this embodiment, the optical fiber connector 100 further comprises an outer housing 5. Two sides of a front end of the outer housing 5 are connected to the connecting housings 1, and a rear end of the outer housing 5 is connected to a tail cap 8. The tail cap 8 is fitted over the transmission cable as a cover. A buckling block 53 is on top surface of the outer housing 5, and the handle body 31 further comprises a rail 313 for engaging with the buckling block 53. That is, the handle body 31 comprises a rail 313 for engaging with the buckling block 53 to limit the handle body 31 to move in a horizontal direction. Moreover, in one embodiment, as shown in FIGS. 2, 4, and 6, the buckling block 53 is upwardly protruding from the top surface of the outer housing 5, and the rail 313 is recessed from the handle body 31 and facing the top surface of the outer housing 5.

Figure 9:
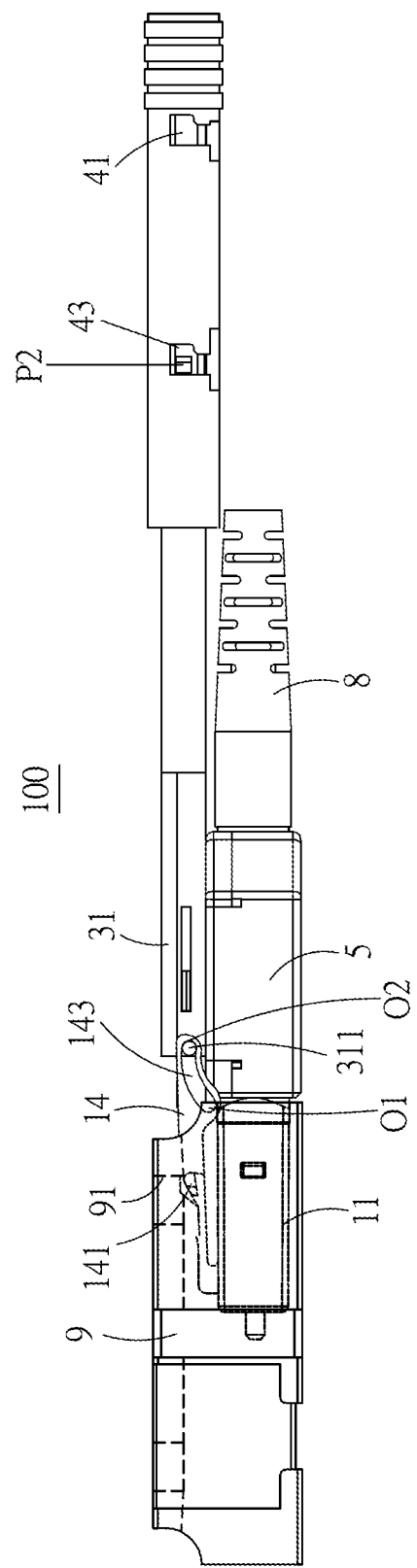
FIG. 9 illustrates a lateral schematic view showing that the elastic arm swings downwardly.

Please refer to FIG. 2 and FIGS. 6 to 9. FIG. 9 illustrates a lateral schematic view showing that the elastic arm swings downwardly. The slidable groove 143 of the elastic arm 14 is a curved groove. When the handle 3 is not pulled, each the slidable blocks 311 of the handle body 31 is at an original position O1 of the corresponding slidable groove 143, and the elastic al ins 14 are swung upwardly to a default position. When the handle 3 is pulled, each of the slidable blocks 311 of the handle body 31 is moved in the corresponding slidable groove 143 and moved to an end position O2 of the slidable groove 143, the buckling block 53 at the surface of the outer housing 5 is limited in the rail 313 of the handle body 31 to allow the handle body 31 to move in a transversal direction, and the slidable blocks 311 are moved and the elastic arms 14 is swung downwardly to allow the engaging blocks 141 on the elastic arms 14 to be detached from the buckling portion 91 of the adapter 9. That is, when the handle 3 is pulled to move in a horizontal direction, the slidable block 311 of the handle body 31 is moved from the original position O1 of the slidable groove 143 to the end position O2 of the slidable groove 143. Because the front end of the elastic arm 14 is extending outwardly and inclinedly from one side of the housing body 11, the slidable block 311 is moved to the end position O2 of the slidable groove 143 to drive the end portion of the elastic arm 14 to swing toward a surface of the connecting housing 1.

Please refer to FIG. 2 and FIGS. 6 to 9. The slidable groove 143 is a curved groove. A first end 1431 of the curved groove is near the connecting housing 1, and a second end 1432 of the curved groove forms the end portion of the elastic arm 14.

Please refer to FIG. 2 and FIGS. 6 to 9. Two engaging protrusions 531 are at two sides of the buckling block 53, and two engaging grooves 3131 are at an inner surface of the rail 313 for engaging with the engaging protrusions 531, respectively. An opening of the rail 313 has two guiding surfaces 3132, and each of the engaging protrusions 531 has a chamfered angle 532 for guiding the corresponding guiding surface 3132.

According to some embodiments of the instant disclosure, the sleeve member is fitted over the handle to allow the length of the handle to be adjustable. Since the handle is retractable, the optical fiber connector can be widely used for cabinets having different intervals between the adapters. When the wire (along with the optical fiber connector) is to be replaced, an operator can detach the wire having the optical fiber connector from the cabinet by adjusting the length of the handle to a proper length. Hence, the optical fiber transmission cables can be detached from the adapters in a convenient manner. Accordingly, a more number of the transmission wires can be assembled in a cabinet as compared with the conventional; that is, the transmission wires can be aligned in a densely manner without affecting the convenience in unplugging or plugging the wires.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. An optical fiber connector, comprising:
   a connecting housing, wherein the connecting housing comprises a housing body and an elastic arm, the elastic arm is outwardly and inclinedly extending from the housing body, and a side portion of the elastic arm comprise a slidable groove; and
   a handle comprising a handle body driving the elastic arm, a slidable block is on the handle body and inserted into the slidable groove;
   wherein, when the handle is pulled to move in a horizontal direction, the slidable block of the handle body is moved from an original position of the slidable groove to an end position of the slidable groove to drive an end portion of the elastic arm to swing toward a surface of the connecting housing;
   wherein, the slidable groove is defined through the elastic arm along a lateral direction of the elastic arm;
   wherein the elastic arm has a first side and a second side opposite to the first side, and the first side is in communication with the second side through the slidable groove;
   wherein the elastic arm comprises two engaging blocks, the engaging blocks are outwardly protruding from the first side and the second side of the elastic arm, respectively.

2. The optical fiber connector according to claim 1, wherein the slidable groove is a curved groove, a first end of the curved groove is near the connecting housing, and a second end of the curved groove forms the end portion of the elastic arm.

3. The optical fiber connector according to claim 1, further comprising an outer housing, wherein two sides of a front end of the outer housing are connected to the connecting housing, a buckling block is on a surface of the outer housing, and the handle body comprises a rail for engaging with the buckling block to limit the handle body to move in the horizontal direction.

4. The optical fiber connector according to claim 3, wherein two engaging protrusions are at two sides of the buckling block, and two engaging grooves are at an inner surface of the rail for engaging with the engaging protrusions, respectively.

5. The optical fiber connector according to claim 4, wherein an opening of the rail has two guiding surfaces, and each of the engaging protrusions has a chamfered angle for guiding the corresponding guiding surface.

6. The optical fiber connector according to claim 1, further comprising a plurality of connecting housings.

7. The optical fiber connector according to claim 6, further comprising a plurality of core components respectively assembled in the connecting housings.

8. An optical fiber connector, comprising:
a connecting housing, wherein the connecting housing comprises a housing body and an elastic arm, the elastic arm is outwardly and inclinedly extending from the housing body, and a side portion of the elastic arm comprise a slidable groove; and
a handle comprising a handle body driving the elastic arm, a slidable block is on the handle body and inserted into the slidable groove;
wherein, when the handle is pulled to move in a horizontal direction, the slidable block of the handle body is moved from an original position of the slidable groove to an end position of the slidable groove to drive an end portion of the elastic arm to swing toward a surface of the connecting housing;
wherein, the slidable groove is defined through the elastic arm along a lateral direction of the elastic arm;
the optical fiber connector further comprises an outer housing, wherein two sides of a front end of the outer housing are connected to the connecting housing, a buckling block is on a surface of the outer housing, and the handle body comprises a rail for engaging with the buckling block to limit the handle body to move in the horizontal direction;
wherein the buckling block is upwardly protruding from a top surface of the outer housing, and the rail is recessed from the handle body and facing the top surface of the outer housing.

9. The optical fiber connector according to claim 8, wherein the slidable groove is a curved groove, a first end of the curved groove is near the connecting housing, and a second end of the curved groove foams the end portion of the elastic atm.

10. The optical fiber connector according to claim 8, wherein two engaging protrusions are at two sides of the buckling block, and two engaging grooves are at an inner surface of the rail for engaging with the engaging protrusions, respectively.

11. The optical fiber connector according to claim 10, wherein an opening of the rail has two guiding surfaces, and each of the engaging protrusions has a chamfered angle for guiding the corresponding guiding surface.

12. The optical fiber connector according to claim 8, further comprising a plurality of connecting housings, wherein at least one of the elastic arms comprises two engaging blocks, the engaging blocks are outwardly protruding from two sides of the elastic arm, respectively.

13. The optical fiber connector according to claim 12, further comprising a plurality of core components respectively assembled in the connecting housings.

14. An optical fiber connector, comprising:
a connecting housing, wherein the connecting housing comprises a housing body and an elastic arm, the elastic arm is outwardly and inclinedly extending from the housing body, and a side portion of the elastic atm comprise a slidable groove; and
a handle comprising a handle body driving the elastic arm, a slidable block is on the handle body and inserted into the slidable groove;
wherein, when the handle is pulled to move in a horizontal direction, the slidable block of the handle body is moved from an original position of the slidable groove to an end position of the slidable groove to drive an end portion of the elastic arm to swing toward a surface of the connecting housing;
wherein, the slidable groove is defined through the elastic arm along a lateral direction of the elastic arm, and the lateral direction is horizontally a left-to-right direction;
wherein, the elastic arm has a first side and a second side opposite to the first side, and the first side is in communication with the second side through the slidable groove.

15. The optical fiber connector according to claim 14, wherein the slidable groove is a curved groove, a first end of the curved groove is near the connecting housing, and a second end of the curved groove forms the end portion of the elastic arm.

16. The optical fiber connector according to claim 14, wherein two engaging protrusions are at two sides of the buckling block, and two engaging grooves are at an inner surface of the rail for engaging with the engaging protrusions, respectively.

17. The optical fiber connector according to claim 16, wherein an opening of the rail has two guiding surfaces, and each of the engaging protrusions has a chamfered angle for guiding the corresponding guiding surface.

18. The optical fiber connector according to claim 14, further comprising a plurality of connecting housings, wherein at least one of the elastic arms comprises two engaging blocks, the engaging blocks are outwardly protruding from two sides of the elastic arm, respectively.

19. The optical fiber connector according to claim 18, further comprising a plurality of core components respectively assembled in the connecting housings.

20. The optical fiber connector according to claim 14, wherein the slidable block is extending along the lateral direction, inserted into the slidable groove from the first side of the elastic arm, and exposed from the second side of the elastic arm.

* * * * *